United States Patent [19]
Cohen

[11] Patent Number: 5,229,096
[45] Date of Patent: Jul. 20, 1993

[54] SILICA GEL

[75] Inventor: Howard J. Cohen, Baltimore, Md.

[73] Assignee: SCM Chemicals, Inc., Baltimore, Md.

[21] Appl. No.: 850,151

[22] Filed: Mar. 12, 1992

Related U.S. Application Data

[63] Continuation of Ser. No. 615,254, Nov. 19, 1990, abandoned.

[51] Int. Cl.$^5$ ............................................. C01B 33/143
[52] U.S. Cl. ................................ 423/338; 252/315.6; 502/233; 521/53
[58] Field of Search ............... 423/335, 338; 502/233, 502/158; 521/53, 64, 63, 62, 61; 252/315.6

[56] References Cited

U.S. PATENT DOCUMENTS 4,965,289  10/1990  Sherrington et al. ................ 521/53

FOREIGN PATENT DOCUMENTS 3016049  1/1988  Japan .................................. 502/233

OTHER PUBLICATIONS

Satish K. Wason, *Silica Gels*, Pigment Handbook: vol. 1: Properties and Economics Second Ed. pp. 175-181 (1988).
Frank H. Dickey, *Specific Adsorbtion*, J. Phys. Chem., 59: 695-707 (1955).
Sidney A. Bernhard, *The Preparation of Specific Adsorbents*, JACS, 74: 4946-4947 (1952).
Linus Pauling, *Tailor-Made Compounds Predicted*, C. E.N., 27: 913 (1949).
R. Curti & V. Colombo, *Chromatography of Stereoisomers with "Tailor Made" Compounds*, JACS, 74: 3961 (1952).
Ralph K. Iler, *The Colloid Chemistry of Silica and Silicates*, Cornell University Press, pp. 150-152 (1955).
Frank H. Dickey, *The Preparation of Specific Adsorbants*, Proc. Natl. Acad. of Sci., 35: 227-229 (1949).

*Primary Examiner*—Olik Chaudhuri
*Assistant Examiner*—Ken Horton
*Attorney, Agent, or Firm*—Lieberman & Nowak

[57] ABSTRACT

The subject invention is a new type of silica gel and process for producing the same. The silica gel is the product of gelling alkali metal silicate with excess acid in aqueous medium containing a minute amount a polymerization modifier. The modifier and salts from the resulting gel are then leached with water before substantial drying effects have ensued. Spray-dried gel particles do not require the additional steps of aging or ammonia treating to achieve the desired result of high surface area and high pore volume. The gel can be produced to have various useful and unusual characteristics including the combination of high surface area, high pore volume, and a large average pore diameter.

13 Claims, 1 Drawing Sheet

SILICA GEL

This application is a continuation of application Ser. No. 615,254, filed Nov. 19, 1990, now abandoned.

BACKGROUND OF THE INVENTION

Silica gels are used for biochemical and industrial processes, such as in the manufacture of foods, beverages, drugs, and in research, to bond ("bind") or adsorb, or to absorb selected materials. Current important uses include ion exchange chromatography, size exclusion chromatography, selective adsorption of molecules, etc. The two most coveted gel qualities in a silica gel are (1) specific binding to a given molecule, and (2) the best balance of the opposite properties of large pore size and high surface area. Conventional gels have irregular pore structures, so that various size molecules are retained. They also can have either large pores (high P.V.) or many pores (high S.A.), but one can only be increased by reducing the other. There has long been a need for silica gels having high surface area and high pore volume and gels having the ability to specifically bind with a given molecule are also sought. The subject invention provides a gel having high surface area, high pore volume and specificity. Further, the subject gels are able to absorb greater than 200 lbs of oil per 100 lbs of gel. This property makes the subject gels particularly useful in applications requiring a high degree of oil absorption such as in polyol purification, as a flatting pigment in paint, or as a carrier for dl-alpha-tocopheryl acetate (Vitamin E). In addition, the gel of the subject invention has a broad utility beyond the selective adsorption desired and sought in the past.

The subject invention discloses a new type of silica gel. The subject gel is made by modifying the unsuccessful and subsequently abandoned specific adsorbent preparation technology of the 1940's and 1950's, and introducing additional processing steps after gel polymerization. The earlier described gels, discussed hereinbelow, were attempts to create a silica gel that specifically binds to a given molecule. Although there has been a long felt need for such a gel, previous attempts using this older technology to create a gel that specifically binds to a given molecule have failed.

In the past, the manufacture of silica gels was attempted by "molding around" a dye molecule; that is, acidifying an aqueous alkali metal silicate solution containing a dye such as methyl orange or the like, air drying the resulting gel, then washing the gel to remove as much dye as possible. The term "molding around" is used to describe the use of a given molecule as a template for the formation of a silica gel, the gel produced having an increased specific ability to adsorb the template molecule. Attempts to create practical gels by the "molding around" method have failed because appreciable amounts of dye remained in the gel. Accordingly, early hopes of silica gel "molded around" a dye molecule were abandoned as unfeasible. Frank H. Dickey, *Specific Adsorption*, J. Phys. Chem., 59: 695–707 (1955); Sidney, A. Bernhard, *The Preparation of Specific Adsorbents*, JACS, 74: 4946–4947 (1952); Linus Pauling, *Tailor-Made Compounds Predicted*, C. & E. N., 27: 913 (1949)

Related silica gels made by a process similar to old method described above were also reported in a communication to the editor of the Journal of the American Chemical Society. In this communication, experiments for separating optical isomers of camphorsulfonic acid and mandelic acid were described. R. Curti and V. Colombo, *Chromatography of Stereoisomers with "Tailor made"Compounds*, JACS, 74: 3961 (1952) In these experiments, gels were "molded around" either camphorsulfonic or mandelic acid molecules instead of dye molecules. The results obtained by using these gels in the chromatotographic separation of solutions containing the two acids were a 30% enrichment of 1-camphorsulfonic acid and a 10% enrichment in the best fraction of mandelic acid. The term "enrichment" refers to the relative increase in concentration of a molecule with respect to the molecules from which it is being separated. As this report was in a communication to the editor, and not a peer reviewed article, it is most likely that preliminary results were reported in an attempt to claim credit for the first successful gel "molded around" a molecule. As these results were never again duplicated in the prior art and no subsequent article corresponding to the communication was published, it is reasonable to deduce that no successful gel that is "molded around" a molecule has been produced. In addition, nowhere has the problem of removing residual molecules to which the gel is "molded around" been solved. A compendium including the above work has been prepared by Ralph K. Iler. *The Colloid Chemistry of Silica and Silicates*, Cornell University Press, pp. 150–152 (1955).

The silica gels of the prior art use "secondary modification" to achieve high surface area, large pore volume or increased specificity. "Secondary modification" refers to treatment of the gel after the gel has been polymerized and washed. Secondary modification typically comprises additional steps such as aging, treating with hot ammonia, etc. These additional steps increase the time required for production and increase costs. By using secondary modification there is normally a tradeoff of surface area for increased pore volume. Accordingly, it is extremely difficult to create a gel having high surface area and high pore volume.

A high surface area silica gel is described in U.S. Pat. No. 3,607,777, issued Sep. 21, 1977 to Winyall. Winyall discloses a surface area of about 650–950 $m^2/g$. However, the pore volume is only 0.35–0.8 $cm3/g$. In addition, no specificity is imparted to the gel.

A process for increasing pore volume of intermediate density silica gels is disclosed in U.S. Pat. No. 3,526,603, issued Sep. 1, 1970 to Acker. This involves a secondary treatment of the formed gel with a hot ammonia solution. Although, two of the gels produced have surface areas and pore volumes within the range of the subject invention, secondary modification, i.e. treatment with hot ammonia, is required to generate these characteristics. By offering a method which does not require secondary modification, the subject invention allows a more economical gel to be produced. Additionally, the gels produced by Acker are not specific to a given molecule.

Increased specificity has been obtained in the prior art by incorporating compounds into the gel, but not by molding a gel around a molecule that acts as a template. An example of a specific gel is described in U.S. Pat. No. 4,169,926, issued Oct. 2, 1979 to McDaniel which describes the addition of a catalyst metal specific to 1-olefin polymerization. The addition of the catalyst of McDaniel is achieved by calcination and as such represents a secondary modification.

A method of producing amorphous silica of controlled oil absorption is described in U.S. Pat. No. 4,312,845, issued Jan. 26, 1982 to Wason. Wason teaches that silica gels having an ability to absorb oil at 60 cm$^3$/100g (approximately 54 lbs/100 lbs) or greater, are desired for the production of dentrifice, and flatting pigment in paint, and for use in polyol purification.

Among the advantages of this invention over the prior art is the combination of high pore volume and high surface area. The subject invention also requires no secondary modification to be specific and a such represents a major improvement over the prior art. Further, the subject gel is made by a direct and simple manufacturing procedure which allows a superior product to be produced at a lesser cost.

SUMMARY OF THE INVENTION

The invention provides a process for producing a silica gel which comprises mixing an alkali silicate, excess acid, and a polymerization modifier so as to form a preliminary gel, and leaching a soluble material from the preliminary gel before substantial drying occurs.

The subject invention also provides a silica gel, produced without secondary modification, having a surface area greater than 300 m$^2$/g, a pore volume greater than 1.2 cm$^3$/g, and an average pore diameter greater than 50 angstroms.

DETAILED DESCRIPTION OF THE INVENTION

Figure 1:
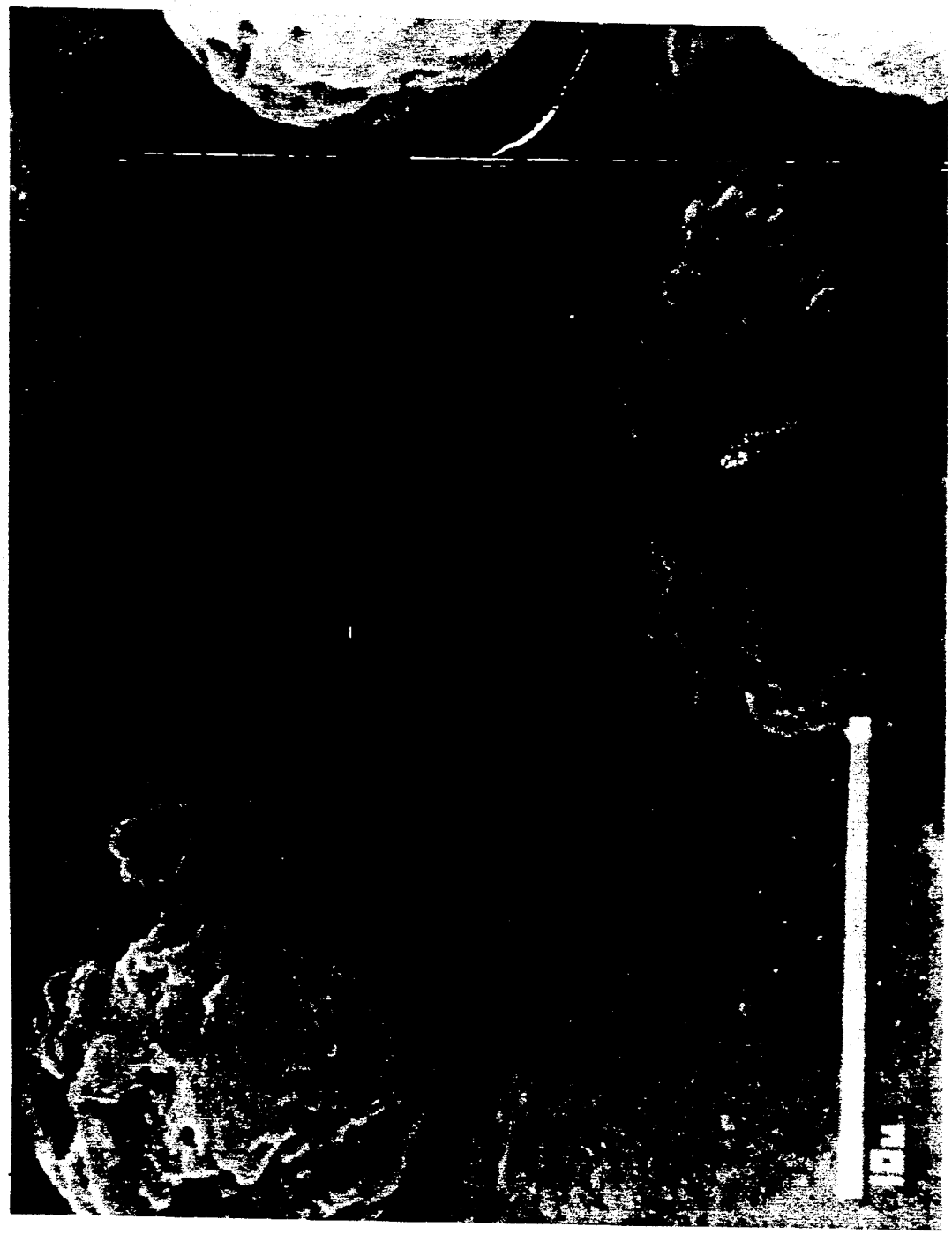
FIG. 1—Shows a photomicrograph of a spray dried silica gel representative of one embodiment of the invention product. A scale of 10 microns is superimposed on the photomicrograph to gauge the size of the particles.

The subject invention provides a silica gel which is "molded around" a polymerization modifier. The term "molded around" is used to describe the process of using a molecule as a template during the formation of the gel. The gel thus produced, specifically binds, to some extent, with the molecule used as a template, thereby making the gel specific to the template molecule. The silica gel is produced by mixing a alkali silicate solution with an excess of acid to form a reactant solution. A polymerization modifier is added to reactant solution, and the resulting gel is then subdivided and washed. The gel may then be used as is or dried.

A variety of aqueous alkali silicate solutions, such as those conventionally used for production of silica gel, may be used in preparing the novel gel, the choice of alkali silicate solution being readily determinable to one skilled in the art. It is preferred to use aqueous sodium silicate solution for efficiency and economy. More preferably, the aqueous sodium silicate solution (liquid silicates are sold with Na$_2$O/SiO$_2$ ratios between 1:1.6 and 1:3.75, and would normally be diluted before reacting with acids such as sulfuric or hydrochloric acid) has a Na$_2$O/SiO$_2$ molar ratio of from about 1:1.6 to about 1:3.75 with about 5% to 32% silica equivalent in the solution. A most preferred sodium silicate ratio is 3.22 Na$_2$O/SiO$_2$ and known as "N" type sodium silicate. The aqueous alkali silicate solution is then mixed with an excess of acid to form a gel. Various conventional acids may be used, the choice of acid being readily determinable to one skilled in the art. A preferred acid is aqueous sulfuric acid. The above-described solutions are rapidly and intimately mixed in a conventional manner. For instance, the mixing may occur using a dual feed, ejector type mixing head.

The polymerization modifier is added to a reactant solution and is preferably dissolved in the reactant solution. The reactant solution may be either a silicate solution, an acid, or both made either prepatory to or during the reactive mixing. Alternatively, the polymerization modifier may be added after mixing, but prior to gelation. Flow from the mixer is then collected and allowed to polymerize. The time for collection may vary from about a few minutes up to about an hour or more depending upon variables such as the pro-portion of acid, the type of sodium silicate, the concentration of the acid and sodium silicate solution, the temperature of the mixed output and desired properties for the finished product. Typically, the conditions involve adding 0.25 grams of polymerization modifier to 32 Baume sodium silicate solution (N type) and reacting with 35 Baume sulfuric acid (approximately 20% excess acid) in an ejector type mixing head. The resulting mixture is allowed to gel and is then set for approximately on hour to reach proper consistency.

When the gel has consolidated enough to handle well, but is still soft enough to cut easily, it is cut or subdivided, as with a coarse screen cutter, to provide small chunks. The small chunks are then subjected to various methods of leaching (the smaller the particles, the faster the leaching).

Leaching of the particles is done with a solvent, typically potable quality tap water. Methanol or other water soluble organic solvents may also be present. Water is the preferred washing agent because it preserves the high pore volume of the gel, removes the excess acid and salts, and is economical to use. Leaching is continued until all significant amounts of the modifier are removed. In the case of a chromophore, all color is preferably leached away. Acidification of the washing agent may also be practiced.

Advantageous modifiers are zwitterionic. Zwitterionic modifiers contain both positive and negative charges and are more likely to bind and effect formation of the gel. Because of its efficiency and chromophoric properties, amino-sulfonic acid has been proven to be a useful zwitterionic modifier. Preferably, the aminosulfonic acid is a lower alkyl ($C_{1-4}$) orange, most preferably methyl orange. The color and modifier are removed at least to the point of visual disappearance when the wet gel is leached with cold or warm water to an effluent pH of 6–7. In addition to aminosulfonic acid, Other zwitterionic modifiers may be used.

Useful zwitterionic modifiers other than amino sulfonic acid, include proteins, such a collagen, and amino acids, such as glycine, 1-cystine, adenosine, inosine, 1-tryptophan, 1-alanine, 1-leucine, and the like. Likewise, substances which generate zwitterionic components during the process may be useful and offer certain advantages. For example yeast adenylic acid hydrolyses in alkali and may be used as an economical alternative to adenosine Removal of the modifier to at least an innocuous residual concentration usually is desirable, especially when the final product is to be used in connection with foods, beverages, cosmetics, or pharmaceuticals. Such inocuous levels may be determined by law.

As little as about 20 ppm or less of the modifier based on the weight of dry silica product may act to alter the ensuing polymerization for the instant purpose. About 40–70 ppm of modifier has been found to be optimal, and the leaching away thereof is efficient when the wet gel particles are small, i.e. about ¼-inch chunks or smaller. If higher concentration of modifier is used, some modifier may remain insoluble, resulting in inclusions that should be washed away. This additional washing is undesirable, however, because of material waste and time consumed.

When the fully leached gel is mildly dehydrated to a water content of about 70%, it is pourable with insignificant sticking. A preferred method of mild dehydration is by air drying. The leached gel may be then used as is for a variety of uses including chill-proofing beer or as a component of a dentifrice or processed further.

The leached wet gel also may be impregnated conventionally with metal-containing catalyst-providing material from solutions of nitrates or other water soluble salts such as those of chromium, platinum, palladium, etc. When the impregnated gel is dried, catalytic residues remain. The high surface area obtained is an advantage for contact catalyst applications such as olefin polymerization or naphtha reforming. Other types of catalyst that may be immobilized include biocatalysts. Biocatalysts may be used in a variety of applications including fermentation. Other uses for silica gels are outlined in *Catalysts that Cut Costs*, Chemical Week, Oct. 20, 1982, pp. 44–52.

In most cases it is advantageous to force-dry the gel to a total water content of no more than about 6%, often down to about 2%–4%. This may be done effectively by use of conventional spray-drying using an inlet drying air temperature between about 200° F. and 1000° F. In such an instance, the leached wet gel may be milled with about 1 to 1.5 parts of additional water by weight to produce a readily sprayable consistency for the dryer.

Alternatively the leached gel may be dried in trays, typically at sub-atmospheric pressure, in a rotary dryer, or solvent-dried conventionally with alcohol and ether. Drying tends to diminish the pore volume. If the leached wet gel is aged, the surface area may be decreased markedly.

The novel gel is prepared to have surface area of about 200 to 1000 $m^2/g$ (measured by the BET method) and pore volume of about 1.2 to 2.5 $cm^3/g$ (measured by nitrogen absorption and desorption using the "Digisorb 2500" apparatus, the trademark for an automatic analyzer made by the Micromeritics Instrument Corporation, Norcoss, Ga). Preferrably, the surface area is greater than 300 $m^2/g$ and the average pore diameter is greater than 50 angstroms. All surface areas and pore volumes referred to herein are determined using these methods. Most preferably, the novel silica gel has a spherical convoluted surface when spray dried, as depicted in FIG. 1. It should be noted, however, that by employing secondary modifications described in the prior art, variations of the novel subject gel may be obtained. Various uses for the novel gel include: adsorbents, such as body powder and anticaking agents for various powders; dentifrice applications; gloss-reduction agents; carriers for oils (e.g. in pharmaceutical and cosmetics); chill-proofing of beer; thickeners; desiccants; abrasives; catalysts and catalyst supports; chromatographic substrates; substrates for immobilized enzymes (e.g. for the processing of whey or other biocatalytic operations); pigmentary applications (i.e. in paints and similar coatings); anti-blocking agents (i.e. in plastics); and immobilized metallic and organometallic materials for catalysts. Particle size is preferably from about 2 to 10 microns (measured by Coulter Counter), although catalyst and desiccant particles may be made much larger, e.g. 10 to 425 mesh (U.S. Standard Sieve Size).

Most proteins are highly sensitive and occur naturally as mixtures of closely related substances. Accordingly, isolation of an individual protein in native form is recognized as a difficult task by those skilled in the art. The subject invention provides a method for "molding" a silica gel using a protein template. The silica gel thus produced selectively adsorbs protein corresponding to the protein used as a template. As a result, the silica gel of the subject invention provides a means for selectively separating proteins from a solution. The silica gel of the subject invention may, therefore, be utilized in both analytical and prepatory chromatography as well as for removing undesirable proteins from a solution.

As a dentrifice application, it is known that silica gels with high pore volumes act as adsorbents, while those with high surface areas act as cleansing agents. The high surface area and high pore volume provided by the subject invention make it possible to use a single gel as both an adsorbent silica gel and a cleansing silica gel for transparent type dentrifices.

Chill-proofing of various liquids, and in particular beer, is a commercial use for which the subject gels may be used. When beer is produced various proteins are present. If these proteins are not removed, beer becomes cloudy upon storage. Presently, some brewers use a non-specific silica gel to bind the proteins. The silica is then removed by filtration.

By isolating the proteins in and using these proteins as a template for forming the subject silica, a highly efficient silica may be produced. Alternatively, a group of mixed amino acids such as found in "Crotein SPO" may be used as a template. "Crotein SPO" is manufactured by Croda, Inc. and contains highly refined collagen hydrolysates and derivatives possessing an orderly molecular arrangement with active side groups. The following examples are set forth to aid in the understanding of the subject invention but should not be construed as limiting. All parts are by weight, all percentages are weight percentages, and all temperatures are in degrees Fahrenheit unless otherwise expressly noted.

EXAMPLE 1

Methyl orange (0.25 gram; 0.00076 mole) dissolved in 4 liters of sulfuric acid solution (Specific Gravity 1.1320 at 24° C.; 7 moles of $H_2SO_4$) at 80° F. was mixed with N-type sodium silicate solution ($Na_2O/3.22$ $SiO_2$ weight ratio; Specific Gravity 1.284 at 23° C.; 6 moles of $Na_2O$ equivalent at 80% °F.) in dual feed, ejector-type mixing head using flow rates of 320 $cm^3$/min for the acid solution and 930 $cm^3$/min for the sodium silicate solution. The orange tinted solution gelled in 16 minutes and was allowed to set (polymerize) for one hour. The resulting gel was comminuted into about ¼-inch chunks. These chunks were washed with hot tap water (approximately 104° F.) until the color was completely gone and the pH of the final wash was approximately 6.5. A sample of the leached gel was solvent-dried to moisture content of about 1%. Particle size was between about 1 micron and 10 microns.

The solvent drying (as referred to in this example and hereafter) comprises replacing the water in the sample with methanol by flooding the sample with methanol. The mixture was then allowed to stand several minutes. The liquid layer was then decanted. This procedure was repeated three times. Ethyl ether was then added in the manner described to replace the methanol in a like manner; this procedure was repeated three times. The sample was then dried in a vacuum oven (20 inches of Hg abs pressure at 200° C.) The product had the combination of high surface area (S.A.) and high pore volume (P.V.) (S.A. of 812 m$^2$/g and P.V. of 2.10 cm$^3$/g). Average pore diameter was 103 [(4 × pore volume × 10$^4$) surface area]. This dried gel can be treated with dilute aqueous platinic chloride (PtCl$_4$) and dried in air to provide a supported, platinated catalyst, i.e. a catalyst with a platinum coated exterior.

When a like leached wet gel was air-dried overnight as called for by prior art preparation, then solvent-dried, pore volume of the resulting gel was drastically lowered to 0.71 cm$^3$/g while the surface area resulting was 707 m$^2$/g. Average pore diameter was 40.

EXAMPLE 2

A leached wet gel prepared according to Example 1 was further treated at 140° F. With an aqueous ammonia solution (pH 9.5) overnight. After draining, the gel was solvent-dried as in Example 1 to give silica gel having the following properties:

| | |
|---|---|
| Pore Volume (cm$^3$/g) | 2.03 |
| Surface Area (m$^2$/g) | 461 |

When the thus-leached and aged gel was subjected to drying by fluid energy milling at 780° F. and the product recovered at 230° F. by a filtering collection device, the resulting dry product exhibited a surface area of 512 m$^2$/g, a pore volume 1.24 cm$^3$/g, and an oil absorption of 207 lb/100 lb of gel.

EXAMPLE 3

The first part of Example 1 was repeated to produce a leached, wet gel (a solvent-dried portion of which had surface are of 615 m$^2$/g and a pore volume of 2.11 cm$^3$/g). The leached wet gel was spray-dried as follows:

The leached, wet gel (4,000 g having water content of 74.12%) was blended with 900 cm$^3$ of deionized water in a high intensity mixer for 45 minutes, then was sand-milled (2,000 cm$^3$ of slurry plus an additional 400 cm$^3$ of deionized water plus 7,000 of sand) for 45 minutes. The resulting gel slurry was separated and spray-dried in a spray dryer. The slurry was fed (at a rate of 220 cm$^3$/min) to a spray dryer with an inlet temperature of 910° F. and a outlet temperature (at the bottom) of 278° F.

The spray-dried product was a high surface area/high pore volume silica gel having the following properties:

| | |
|---|---|
| Pore Volume (cm$^3$/g) | 1.31 |
| Surface Area (m$^2$/g) | 776 |
| Centrifuge Density (g/cm$^3$) (a measure of bulk density) | 0.25 |
| Oil Absorption (lbs/100 lbs of gel) | 239 |
| Particle Size, microns | 2–15 |
| Average Pore Diameter, (angstroms) | 137 |
| % Moisture Absorption (using the method of Carr et al., I. & E.C., 2014 (1949)) | 25 |

A scanning electron micrograph (SEM) of this spray-dried product is shown in FIG. 1.

A wet gel was made in a manner set forth in Example 1, except no methyl orange was used, and the comminuted gel was washed with tap water for 9 hours to give a final effluent pH of 6. The leached gel was prepared for drying and spray-dried essentially like the wet gel of Example 3, except that the dryer inlet temperature was 920° F., the outlet temperature was 320° F., and the feed was 288 cm$^3$/min. The spray-dried product has surface area of 753 m$^2$/g and pore volume less than 0.8 cm$^3$/g.

EXAMPLE 4

A wet gel was prepared as in Example 1, except that only 0.125 g of methyl orange dissolved in 4 liters of the sulfuric acid solution used. A slurry of the leached gel was prepared for and spray-dried like that of Example 3 using an inlet temperature of 910° F. This spray-dried product had a high surface area and a high pore volume. The surface area was 736 m$^2$/g and the pore volume was 1.25 cm$^3$/g. Centrifuge density was 0.22 g/cm$^3$ and oil absorption was 276 lbs/100 lbs of gel.

EXAMPLE 5

Example 1 was repeated except that only 0.075 g of methyl orange was dissolved in 4 liters of the sulfuric acid solution. After the sample was allowed to set for 1 hour and comminuted into smaller particles, half the sample was set aside to air dry overnight, then extracted with methanol in a Soxhlet extractor for 24 hours. All the methyl orange could not be removed. The gel retained a faint orange color. The methanol was replaced with ethyl ether, and the gel was dried in a vacuum as described in Example 1. Surface area of this product was 614 m$^2$/g., and the pore volume was only 0.56 cm$^3$/g.

The other half of the sample was washed as described in Example 1. It was stored wet in a plastic bag for 6 weeks prior to spray-drying. The sample was prepared for spray-drying by blending 4,000 g of the leached gel and 1,400 cm$^3$ of water in a high intensity mixer for 45 minutes. An additional 500 cm$^3$ of water was added during this mixing to further thin the batch (total water = 1,900 cm$^3$). 3,000 cm$^3$ of the resulting slurry was milled with 1,800 cm$^3$ of water and 9,100 g of 1.3 mm alumina beads. The output was spray-dried using an inlet temperature of 920° F. and an outlet temperature of 380° F. Surface area and the pore volume of the spray-dried product were 485 m$^2$/g and 1.53 cm$^3$/g, respectively. The resulting product had Centrifuge Density of 0.22 g/cm$^3$ and oil absorption of 285 lbs/100 lbs of gel.

EXAMPLE 6

Methyl orange (0.25 gram; 0.00076 moles) dissolved in 8 liters of sodium silicate solution (Specific Gravity 1.284 at 24° C.; 12 moles of silica equivalent) was mixed with a sulfuric acid solution (Specific Gravity 1.332 at 23° C.; 14 moles) in a dual feed mixing head using a flow rate of 320 cm$^3$/min for the acid solution and 930 cm$^3$/min for the sodium silicate solution (Na$_2$O/3.22 SiO$_2$). The solution containing methyl orange was permitted to gel (20 min) then allowed to stand an additional hour for it to polymerize. The gel was comminuted into about inch chunks and which were leached with hot water until the orange color disappeared. Final wash effluent was pH 6.6. A sample was removed and solvent dried as in Example 1. The surface area was 672

$m^2/g$ and the pore volume was 2.16 $cm^3/g$. The rest of the sample was permitted to soak for 10 days in water at pH 6.88, and a sample was again removed and solvent dried. The surface area was 686$m^2/g$ and the pore volume 2.15 $cm^3/g$, showing no effect with soaking time. The sample was drained, and stored wet in a plastic bag for approximately 3 months. The sample was prepared for drying and spray-dried in a manner similar to that of Example 5 to yield a dry gel having surface area of 399 $m^2/g$, pore volume of 1.44 $cm^3/g$. This material was mixed with body feed (diatomacious silica) and tested successfully as a beer chill-proofing agent. A similarly-prepared dry gel having pore volume of 1.44$cm^3/g$ and surface area of 616 $m^2/g$ was likewise useful.

EXAMPLE 7

Ethyl orange (0.125 gram; 0.00035 moles) dissolved in 2 liters of sulfuric acid solution (Specific Gravity 1.331 at 25° C.) was mixed with a sodium silicate solution ($Na_2O/3.22\ SiO_2$; Specific Gravity 1.282 at 26° C.) in dual feed mixing head using feeds of 320 $cm^3/min$ for the acid solution and 930 $cm^3/g$ for the sodium silicate solution. The solution was allowed to set (15 min.) and then permitted to set for an additional hour, before it was comminuted and leached with hot water until the color disappeared. The pH of the final wash was 6.8. A sample was removed and solvent dried as in Example 1. The surface area was 690 $m^2/g$ and the pore volume was 2.04 $cm^3/g$.

EXAMPLE 8

A preparation of wet gel like that of Example 5 is carried out except that instead of methyl orange, a 0.25 g quantity of either (a) 1-tryptophan or (b) a collagen made for use in hair spray ("Cosmetic Protein SPO", a product of Croda, Inc., NY, N.Y.) was substituted. Both gels were washed with 20° C. water. The solvent-dried gel products had the following properties:

| (a) Pore Volume, $cm^3/g$ | 1.66 |
|---|---|
| Surface Area, $m^2/g$ | 663 |
| (b) Pore Volume, $cm^3/g$ | 2.32 |
| Surface Area, $m^2/g$ | 995 |

The undried product of (b) was fluid energy-milled in cold air to obtain a gel with about 60% moisture content or below. Such product is substantially neutral (6-8 pH) rather than the lower pH silicas customarily used as dental abrasives.

Experiment (b) was repeated with 0.70 g (instead of 0.25 g) dissolved in 4 liters of sulfuric acid solution. The gel was washed free of excess acid and salts, than aged in aqueous ammonia (pH 9.5-10) for 232 hours at 62° C. After solvent-drying the pore volume was 2.16 $cm^3/g$ and the surface area was 262 $cm^2/g$.

EXAMPLE 9

A silica hydrosol was prepared by reacting 3.5 l of 35 Baume sulfuric acid solution containing 0.25 g adenosine with 8.0 l of 32.0 Baume silicate ($Na_2O:SiO_2$ molar ratio 1:3.22).

The hydrosol was allowed to set, thereby forming a hydrogel. The hydrogel was then sized as described in previous examples and washed with hot tap water until the wash maintained a pH of 6.7.

The washed hydrogel was then solvent dried with methanol and ethyl ether as previously described.

The solvent dried gel had the following properties:

| Pore volume | 1.81 $cm^3/g$ |
|---|---|
| Surface Area | 804 $m^2/g$ |

Another portion of the gel was dried at 200° C. and micronized in a fluid energy mill to an average particle size of 3.65 micrometers.

The micronized gel had the following properties:

| Pore volume | 1.18 $cm^3/g$ |
|---|---|
| Surface Area | 251 $m^2/g$ |
| Average Pore Diameter | 156 angstroms |
| Oil absorption | 202 lb/100 lb |
| Centrifuge Density | 0.29 $g/cm^3$ |

EXAMPLE 10

Example 9 was repeated using 0.25 g inosine instead of adenosine.

The solvent dried sample had the following properties:

| Pore volume | 1.90 $cm^3/g$ |
|---|---|
| Surface Area | 965 $m^2/g$ |
| Average Pore Diameter | 86 angstroms |

A sample of the above example was water washed and dried at 200° C. and micronized to an average particle size of 4.9 micrometers.

The resulting sample had the following properties:

| Pore volume | 0.78 $cm^3/g$ |
|---|---|
| Surface Area | 469 $m^2/g$ |
| Average Pore Diameter | 85 angstroms |
| Centrifuge Density | 0.29 $g/cm^3$ |

This sample proved to be an excellent chill-proofing agent for beer.

EXAMPLE 11

Example 9 was repeated except instead of the described adenosine solution, 1.0 g of glycine was added to 4.0 l of sulfuric acid.

The material that was solvent dried demonstrated the following properties:

| Pore volume | 1.24 $cm^3/g$ |
|---|---|
| Surface Area | 850 $m^2/g$ |
| Average Pore Diameter | 77 angstroms |

The remaining portion of the above-gel was then aged in hot ammonia solution for 18 hours and solvent dried. Analysis of the resulting gel showed the following properties:

| Pore volume | 2.58 $cm^3/g$ |
|---|---|
| Surface Area | 268 $m^2/g$ |
| Average Pore Diameter | 257 angstroms |

The resulting gel was then washed with nine displacements of water, and treated with 8.6 g/g aluminum nitrate solution and dried. (See U.S. Pat. No. 4,595,578 for a further discussion of aluminum nitrate treating of silica gel).

Analysis of the resulting gel showed the following properties:

| | |
|---|---|
| Pore volume | 2.00 cm$^3$/g |
| Surface Area | 273 m$^2$/g |
| Average Pore Diameter | 257 angstroms |

What is claimed is:

1. A process for producing a silica gel which comprises mixing an alkali silicate, excess acid, and a polymerization modifier molecule so as to form a preliminary gel in which the silica is molded around the polymerization modifier molecule, and leaching soluble material from the preliminary gel before drying occurs.

2. A process of claim 1, wherein the alkali silicate is aqueous sodium silicate.

3. A process of claim 2, wherein the aqueous sodium silicate has a Na$_2$O:SiO$_2$ molar ratio of from about 1:1.6 to about 1:3.75 with about 5% to 32% silica equivalent in the solution.

4. A process of claim 1, wherein the acid is an aqueous sulfuric acid.

5. A process for producing a silica gel which comprises mixing an alkali silicate, excess acid, and a zwitterion so as to form a preliminary gel, and leaching soluble material from the preliminary gel before drying occurs.

6. A process for producing a silica gel which comprises mixing an alkali silicate, excess acid, and a chromophore so as to form a preliminary gel, and leaching soluble material from the preliminary gel before drying occurs.

7. A process for producing a silica gel which comprises mixing an alkali silicate, excess acid, and a protein so as to form a preliminary gel, and leaching soluble material from the preliminary gel before drying occurs.

8. A process for producing a silica gel which comprises mixing an alkali silicate, excess acid, and an amino acid so as to form a preliminary gel, and leaching soluble material from the preliminary gel before drying occurs.

9. A process of claim 6, wherein the chromophore is a $C_{1-4}$ alkyl orange.

10. A process of claim 9, wherein the $C_{1-4}$ alkyl orange is methyl orange.

11. A process of claim 9, wherein the $C_{1-4}$ alkyl orange is present in a concentration of about 20–100 ppm based on the weight of dry silica gel product.

12. A process of claim 7, wherein the protein is present in a concentration of about 20–100 ppm based on the weight of dry silica gel product.

13. A process of claim 8, wherein the amino acid is present in a concentration of about 20–100 ppm based on the weight of dry silica product.

* * * * *